(12) United States Patent
Lloyd et al.

(10) Patent No.: US 9,513,438 B2
(45) Date of Patent: Dec. 6, 2016

(54) PORTABLE FIBER OPTIC SPLICER

(71) Applicants: Jeffrey M. Lloyd, San Diego, CA (US); Brandon J. Wiedemeier, San Diego, CA (US)

(72) Inventors: Jeffrey M. Lloyd, San Diego, CA (US); Brandon J. Wiedemeier, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 219 days.

(21) Appl. No.: 14/501,545

(22) Filed: Sep. 30, 2014

(65) Prior Publication Data

US 2016/0091661 A1    Mar. 31, 2016

(51) Int. Cl.
*G02B 6/255* (2006.01)
*B65D 85/68* (2006.01)

(52) U.S. Cl.
CPC ............. *G02B 6/2553* (2013.01); *B65D 85/68* (2013.01); *G02B 6/2557* (2013.01); *G02B 6/2555* (2013.01)

(58) Field of Classification Search
CPC ......... G02B 6/24; G02B 6/255; G02B 6/2551; G02B 6/2553; G02B 6/2555; G02B 6/2556; G02B 6/2557; G02B 6/3616; G02B 6/3803; G02B 6/3805; B65D 85/68
See application file for complete search history.

(56) References Cited

U.S. PATENT DOCUMENTS

2014/0157830 A1*  6/2014  Kawanishi ........... G02B 6/2555
65/501

FOREIGN PATENT DOCUMENTS

| JP | 2006-201305 A | * | 8/2006 |
| JP | 2010-039002 A | * | 2/2010 |
| WO | WO 2016/042671 A1 | * | 3/2016 |

* cited by examiner

*Primary Examiner* — Michael Tolin
(74) *Attorney, Agent, or Firm* — SSC Pacific Patent Office; Arthur K. Samora; Kyle Eppele

(57) ABSTRACT

A portable splicer for an optical fiber can include a first case half and second case half with respective exterior and interior surfaces, which can be hingedly attached to define a case having an interior case surface. At least two clamps for receiving the cable to be spliced and a fuser can be attached to the interior case surface. A deployed configuration for the splice can be established, wherein the first exterior and second exterior surfaces are co-planar. In the deployed configuration, the fuser is located between the two clamps and the fuser and clamps are substantially co-planar. A first channel can be formed in the first exterior surface and a second channel can be formed in the second exterior surface. A bar can be slidably disposed within one of the channels, and can be extended into the other channel to thereby fix the case halves in the deployed configuration.

5 Claims, 5 Drawing Sheets

PORTABLE FIBER OPTIC SPLICER

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil, referencing NC 102153.

FIELD OF THE INVENTION

The present invention pertains generally to splicing systems. More particularly, the present invention pertains to splicing devices for optic fibers. The present invention can be particularly, but not exclusively, useful as a portable optic fiber splicer, which can be deployed in remote, rugged spaces to quickly and reliably splice delicate optical fibers.

BACKGROUND OF THE INVENTION

Splicers for optic fibers are known in the prior art. But for many prior art splicers, the problem can be one of stability. More specifically, since optical fibers are extremely small relative to other types of cables, the fusers that splice the cables are often also small. To accomplish the splice, the optical fiber splicers typically must fix the ends to be spliced in position, with very small tolerances. To do this, the fusion splicers themselves typically have small cable anchors or vices, however they are not usually capable of handling bending loads from even lightly armored cable, and the fusers typically only provide stabilization one to two inches from the bare fiber splice. However, since almost all cable runs are much, much larger than one to two inches, this stabilization area is typically inadequate in any environment other than a lab environment.

In addition to the above considerations, although the optical fiber fusion is often very small and light, the optical fiber cable is often surrounded by bulky, shielding or armor, which can create additionally stability issues when attempting to splice a very small splicing area. Still further, cable runs are often in remote, rugged areas, where it would be extremely undesirable to pull the cable up, take the cable to a lab or similar splicing facility, splice the cable, and then re-run the cable once it is spliced. What is needed is a field splicing device, which can work with existing splicing units, but provide enhanced stability during three phases: 1) During the staging of the cables prior to splicing; 2) During the removal of the spliced cable from the fusion splicing section to slide on basic heat shrink/steel tube reinforcement; and, 3) During placement of the basic heat shrink tube into the heat source provided on most commercial splices. Without increased management of the stability of the splicing platform during these stages, management of the exposed, delicate fiber throughout these phases can consistently lead to breakage without proper stabilization.

In view of the above, it is an object of the present invention to provide a portable fiber optic splicer that can allow for steady and safe splicing of fiber optic cables utilizing fusion splicing out in the field once the cable is deployed. Another object of the present invention is to provide a portable fiber optic splicer that can facilitate fusion splicing such that the splice is not kinked or broken during the process by accidently knocking the two ends to be spliced, or by separating the two cables too much before shielding is applied to the splice. Yet another object of the present invention to provide a portable fiber optic splicer that can firmly grip the cable ends at a sufficient distance from the splicer to prevent off angle jolts which typically occur in the field while attempting to make field repairs of optic fiber cable. Still another object of the present invention to provide a portable fiber optic splicer that can be adapted to be used both in the field and in the laboratory without requiring any major configuration changes. Another object of the present invention to provide a portable fiber optic splicer, which can be easy to manufacture, and which can be used in a cost-efficient manner.

SUMMARY OF THE INVENTION

A portable splicer for an optical fiber in accordance with several embodiments of the present invention can include a first case half having a first interior surface and a first exterior surface, and a second case half having a second interior surface and second exterior surface. The second case half can be hingedly attached to the first case half to define a case having an interior case surface. At least two clamps and a fuser can be attached to the interior case surface.

The splicer can have a stowed configuration, wherein the first case half and the second case half are latched together so that the case encloses the clamps and the fuser. The splicer can be opened to establish a deployed configuration. In the deployed configuration, the first exterior surface and the second exterior surface are co-planar, and the fuser is located between at least two of the clamps so that the fuser and clamps are substantially co-planar. The clamps can each include a tensioner for receiving the cable shielding that surrounds the optical fiber. The tensioner can be attached to a carriage, which can further be slidably disposed on a guide, which is attached to the interior case surface. With this configuration, the shielding can be placed into the tensioners and the moved in translation and pivoted to place the optical fiber within the fuser for splicing.

To fix the clamps and fuser in position relative to each other when the splicer is in a deployed configuration, the splicer can include a locking mechanism. In some embodiments, the locking mechanism can include a first rail formed with a first slot, which can be attached to the first exterior surface, and a second rail which can be formed with a second slot, and which can also be attached to the second exterior surface. A bar can be slidably disposed within the first slot, and can extend from the first slot into the second slot (or vice versa) to selectively fix the splicer in the deployed configuration. Alternatively, the first and second case half exterior surfaces can be formed with a respective channel, and a bar can be slidably disposed in one of the channels, to extend into the other channel to thereby fix the splicer in the deployed configuration.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

Figure 1:
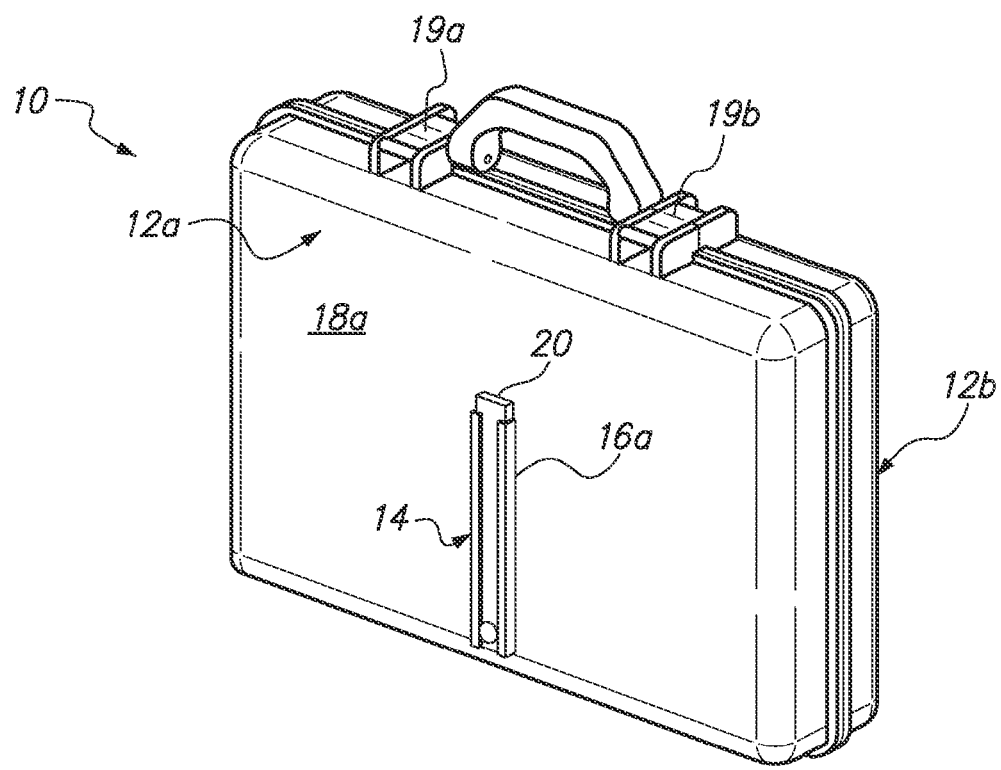
FIG. 1 is a side elevational view of the optical fiber splicer of the present invention according to several embodiments.
Figure 2:
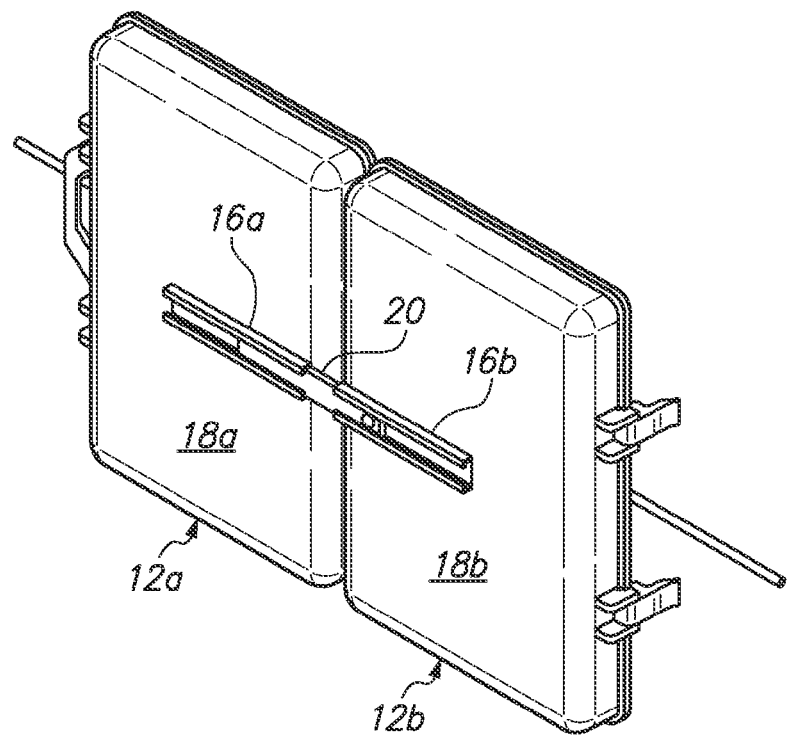
FIG. 2 is a bottom elevational view of the splicer FIG. 1, when in a deployed configuration.
Figure 3:
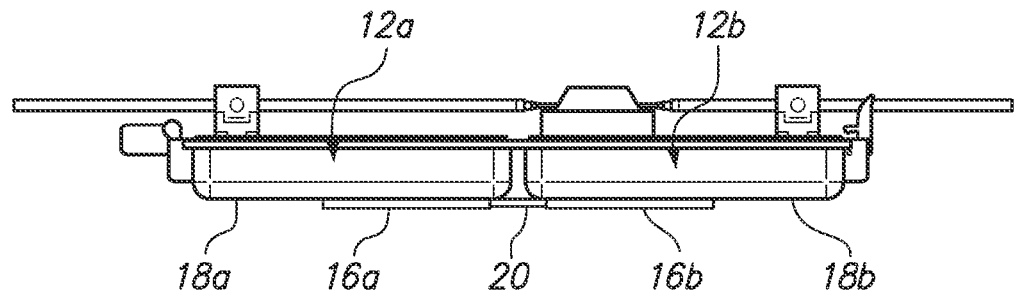
FIG. 3 is a side plan view of the splicer of FIG. 2.

Referring initially to FIGS. 1-3, a portable field splicer for an optical fiber is shown, and can be generally designated by reference character 10. As shown, the splicer 10 can include case halves 12a, 12b, which can be hingedly attached to form the case for the field splicer 10. The case halves 12 can cooperate to both store the working components of the splicer (described in more detail below), and to allow for adequate clamping and positioning of the cable ends during splicing. The design of the splicer can prevent accidental breakage of the splice during fusion splicing by providing a stable platform from which to perform the splice.

As shown in FIGS. 1-3, the splicer 10 can further include a locking mechanism 14. For the embodiments described in FIGS. 1-3, locking mechanism 14 can include a rail 16a, which can be fixed to the exterior surface 18a of case half 12a. Locking mechanism can further include at least one other rail 16b, which can be fixed to exterior surface 18b of case half 12b, as shown in FIG. 2. A bar 20 can be slidably disposed within rail 16a (or 16b).

In FIG. 1, splicer 10 is shown in a stowed configuration and latched together with latches 19. To deploy splicer 10, the case halves 12 can be opened and bar 20 can be extended from 16a into 16b, as shown in FIGS. 2 and 3. With this configuration, case halves 12 are fixed relative to each other so that exterior surfaces 18 can be substantially co-planar, and splicer 10 can be used to splice optical fibers, even if there is no horizontal surface to set the splicer 10 on. The splicer can literally be used to splice optical fibers while splicer 10 is in the user's lap.

Figure 4:
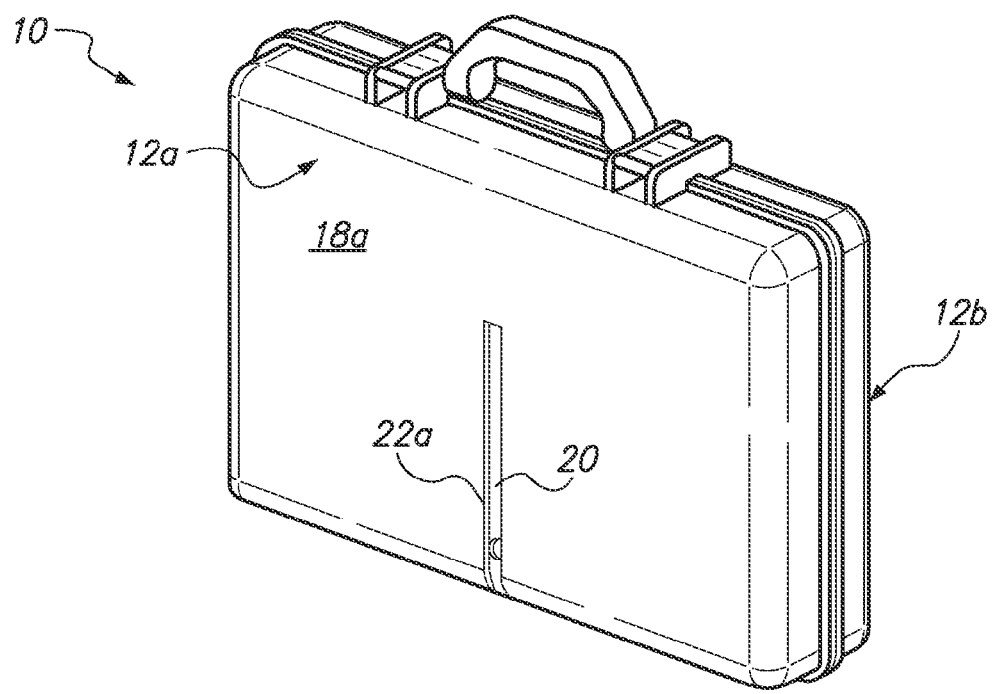
FIG. 4 is a side elevational view of the splicer of FIG. 1, but with an alternative embodiment for the locking mechanism for the splicer.
Figure 5:
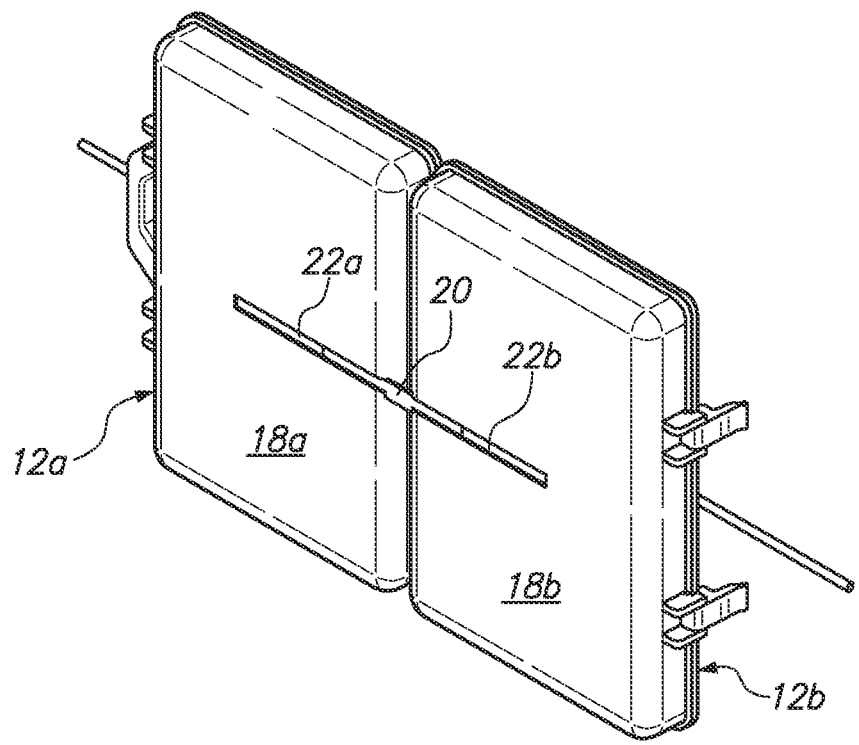
FIG. 5 is a bottom elevational view of the splicer of FIG. 4, when in a deployed configuration.
Figure 6:
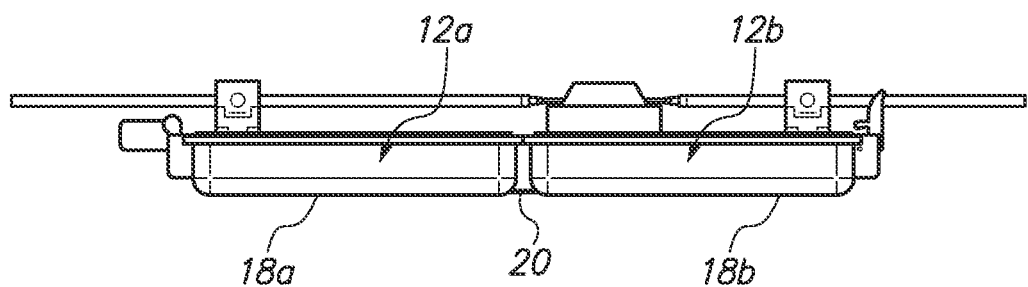
FIG. 6 is a side plan view of the splicer of FIG. 5.

In still other embodiments, and as shown in FIGS. 4-6, the case halves 12 can be formed with respective channels (channel 22a is shown in FIG. 4). Bar 20 can be slidably disposed within channel 22a (or channel 22b). For deployment, bar 20 can be extended from channel 22a into 22b to thereby fix the case halves 12 in the deployed configuration, with exterior surface 18 being coplanar, as described above. The configuration for these embodiments can be seen in FIGS. 5-6. These embodiments can offer the additional advantage of maintaining a smooth outside profile of the case halves.

Figure 7:
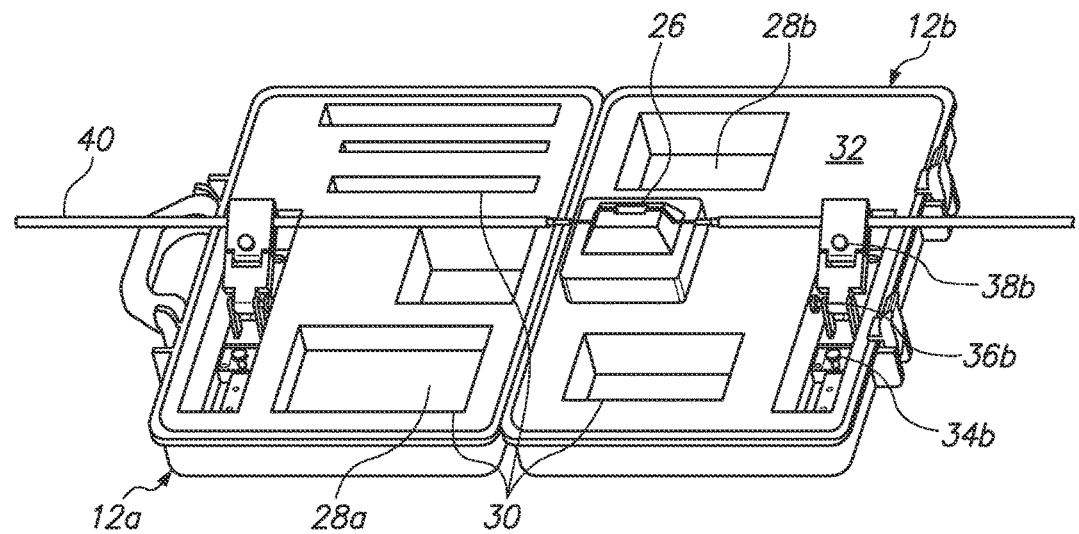
FIG. 7 is side elevational view of the splicer of FIG. 2, which shows the optical fiber to be spliced placed within the fuser.
Figure 8:
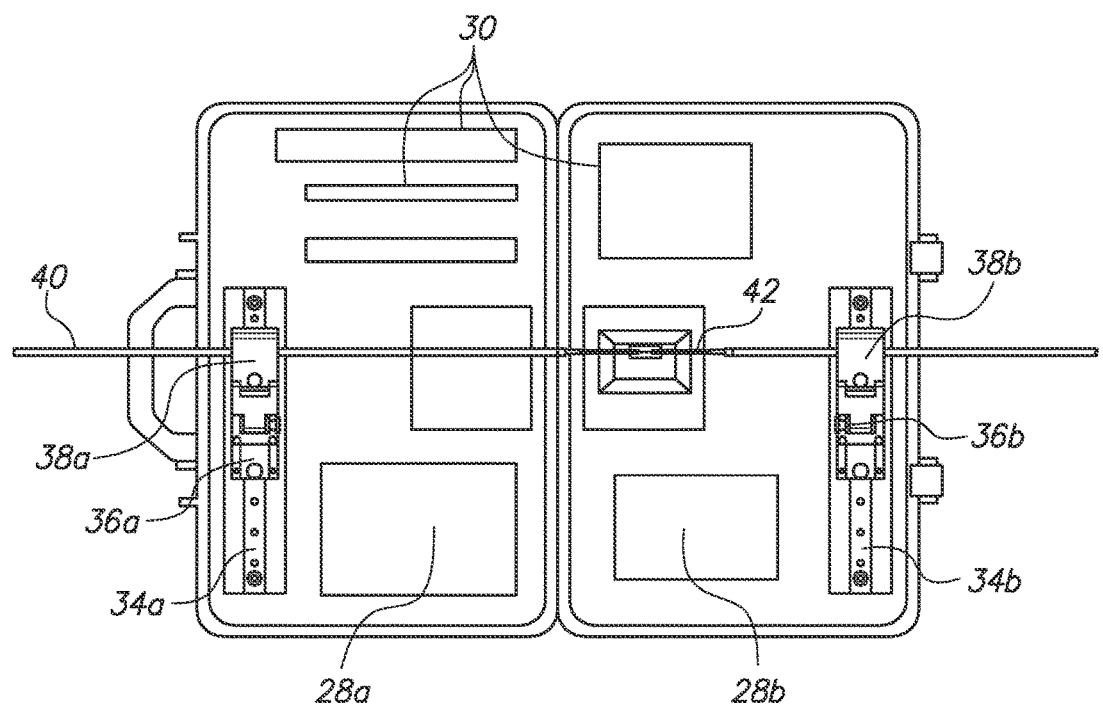
FIG. 8 is top plan view of the splicer of FIG. 7.

Referring now to FIGS. 7-8, the interior working components of the splicer 10 can be seen in greater detail. As shown, the splicer 10 can in include at least two clamps 24a, 24b and a commercial fuser 26, which can be fixed to the interior surfaces 28a, 28b of the respective case halves 12a, 12b. Fuser 26 can be fixed to either surface 28a or 28b, provided that fuser 26 is located between clamps 24a and 24b when the splicer is in the aforementioned deployed configuration. The fuser 26 and clamps 24 can fit inside configurable cutouts 30 in commercial case foam 32, which can be fixed to interior surfaces 28, to protect the working components of splicer 10 when it is in a stowed configuration. The cutouts 30 can also be used to store splicing tools, supplies and components (not shown), which may be needed by the user to accomplish the splicing function.

Referring still to FIGS. 7-8, clamps 24a, 24b can each include a respective guide 34a, 34b, which can be fixed to respective interior surfaces 28a, 28b. Carriages 36a, 36b, can be slidably disposed to move in translation along guides 34a and 34b. Clamping tensioners 38a, 38b can each be pivotably attached to a respective carriage 36a, 36b. The tensioners 38 can be used to secure the two ends of a cable 40 at a significant distance from the fuser 26 with enough gripping force available to secure high stiffness armored cables. In still other embodiments of the invention, an elevating means (not shown in the Figures) can be fixed to the carriage 36 and the tensioner can be pivotably attached to the elevating means. These embodiments can provide a greater range of motion of the cable once it is fixed in place within the tensioners 38, if needed.

As shown in FIGS. 7-8, the cable 40 can be placed in the tensioners 38. The shielding can be stripped from portion of the cable to expose the bare optical fiber 42 for splicing. After splicing, the clamps 24 on the case can be used to pivot cable 40 so that the spliced portion of fiber 42 is moved out of the fuser 26. The carriages 36 can further allow for steady removal from the splicing apparatus. In this position, the clamps 24 can hold the cable in place so that the operator can use both hands to slide a heat shrink sleeve (not shown) into place over the spliced portion of optical fiber 42. Once in place, the tensioners 38 can slide forward and/or be pivoted allowing the cable to be set into the heat source while maintaining full stability and control of the cable 40.

Figure 9:
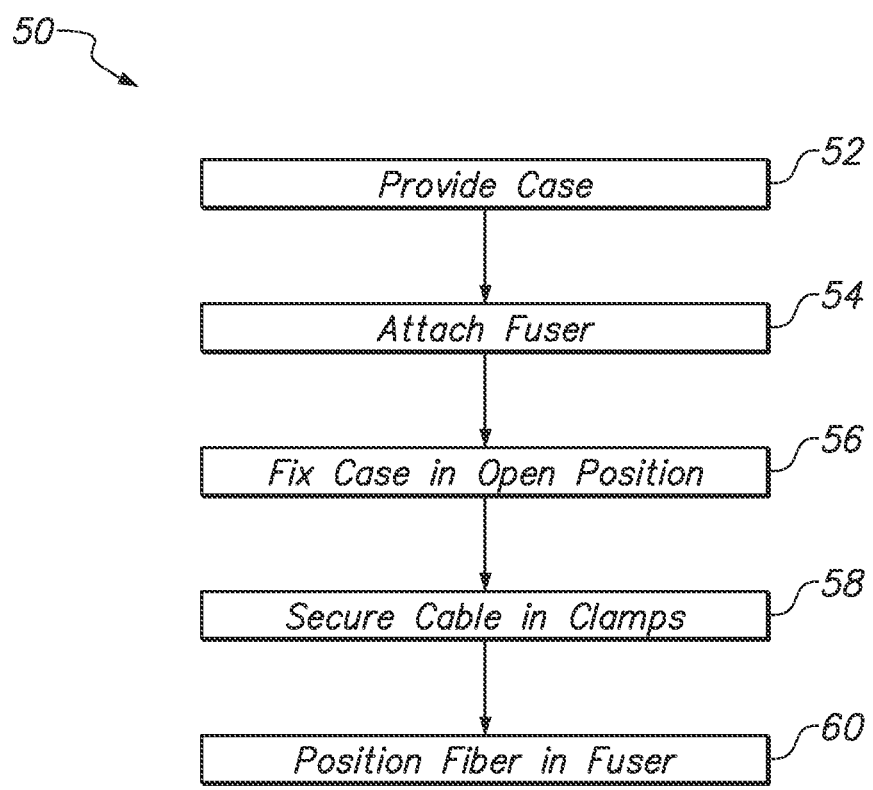
FIG. 9 is a block diagram that is representative of steps that can be taken to practice the methods of the present invention according to several embodiments

Referring now to FIG. 9, a block diagram which shows steps that can be taken to practice the methods of the present invention can be shown and can be generally designated by reference character 50. As shown in FIG. 9, method 50 can include the step 52 of providing a case. The case can include two case halves 12 having the structure and cooperation of structure as described above. Next, the methods can include the step 54 of attaching a fuser 26 to the interior surface 28a of the case. The methods can further include the step 56 of fixing the case in the open position. This step can be accomplished using the above-cited locking mechanisms 14 so that the exterior surfaces 18 are co-planar, as described above.

As shown in FIG. 9, the methods according to several embodiments can further include the step of securing the cable 40 in the clamps 24, as shown by step 58. To do this, cable 40 can be placed in the tensioners 38, and then tightening the tensioners. Still further, the methods can include the step of positioning the optical fiber 42 within the fuser 26 for fusing, as shown by block 60 in FIG. 9. To do this, both carriages 36a, 36b can be moved simultaneously along guides 34a, 34b, and then tensioners 38a, 38b can be simultaneously pivoted to move fiber 42 into fuser 26. In cases where an elevating means is included, the elevating means can be used in conjunction with the pivoting action of the tensioners 38 to thereby position the fiber 42 in the fuser 26. Fuser 26 can then be operated according to the fuser manufacturer's instructions to accomplish the splice.

Once complete, the carriages tensioners 38 can be simultaneously pivoted to move the cable 40 so that the fiber 42 is removed from the fuser. The carriages 36 can then be simultaneously moved until the fiber 42 is clear of fuser 26 and there is enough working room to apply heat shrink shielding to protect the newly spliced portion of cable 40 according to the user's needs. These methods according to several embodiments, can stabilize the cable 40 and fiber 42 during splicing so that the splice has a much better chance of being successful, which can greatly reduce the maintenance costs of these types of splicing operation, which can be an expensive process when in remote locations, especially if the process must be repeated because the newly-spliced fiber 42 broke before shrink wrap and shielding could be applied to protect the splice.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for field splicing first and second optical cables, said method comprising the steps of:

A) providing a case, said case having an interior surface;
   said case having a first case half with a first interior surface and a first exterior surface formed with a first channel;
   said case also having a second case half with a second interior surface and second exterior surface formed with a second channel, said second case half hingedly attached to said first case half to define a case having an interior case surface;

B) attaching a fuser, a first clamp and a second clamp to said interior case surface;

B1) placing said first case half exterior surface and said second case half exterior surface in contact with a planar surface;

C) fixing said case in an open position so that said fuser is between said first clamp and said second clamp when said first case half exterior surface and said case half second exterior surface contact said planar surface;

D) securing said first optical cable within said first clamp and said second optical cable within said second clamp; and, E) moving said first clamp to position said first optical cable within said fuser, and said second clamp to position said second optical cable within said fuser.

2. The method of claim 1, wherein said step B) is accomplished by attaching said first clamp to said first interior surface, by attaching said second clamp to said second interior surface.

3. The method of claim 1, wherein said first cable is surrounded by first shielding, wherein said second cable is surrounded by second shielding, and wherein:
   said first clamp includes a first guide attached to said interior case surface, a first carriage slidably disposed on said first guide and a first tensioner pivotably attached to said first carriage;
   said second clamp includes a second guide attached to said interior case surface, a second carriage slidably disposed on said second guide and a second tensioner pivotably attached to said second sliding means; and,
   wherein said step D) is accomplished by placing said first shielding in said first tensioner and said second shielding in said second tensioner.

4. The method of claim 3 wherein said step E) is accomplished by simultaneously pivoting said first tensioner and said second tensioner.

5. The method of claim 4 wherein said step E) is further accomplished by simultaneously moving said first tensioner and said second tensioner.

* * * * *